United States Patent
Chiang

(10) Patent No.: US 7,559,603 B1
(45) Date of Patent: Jul. 14, 2009

(54) BICYCLE SEAT TUBE ADJUSTING ASSEMBLY

(75) Inventor: Douglas Chiang, Taichung Hsien (TW)

(73) Assignee: Tien Hsin Indistries Co., Ltd., Taichung County (TW)

( * ) Notice: Subject to any disclaimer, the term of this patent is extended or adjusted under 35 U.S.C. 154(b) by 0 days.

(21) Appl. No.: 12/013,481

(22) Filed: Jan. 14, 2008

(51) Int. Cl.
*B62J 1/00* (2006.01)

(52) U.S. Cl. ............................ 297/215.14; 297/215.15

(58) Field of Classification Search .............. 297/195.1, 297/215.13, 215.14, 215.15
See application file for complete search history.

(56) References Cited

U.S. PATENT DOCUMENTS

| | | | | |
|---|---|---|---|---|
| 4,275,922 A | * | 6/1981 | Juy | 297/215.14 |
| 4,502,811 A | * | 3/1985 | Patriarca | 297/215.14 |
| 4,983,063 A | * | 1/1991 | Phillips | 297/215.14 |
| 5,020,851 A | * | 6/1991 | Chen | 297/195.1 |
| 5,513,895 A | * | 5/1996 | Olson et al. | 297/215.14 |
| 5,547,155 A | * | 8/1996 | Herting | 248/219.2 |
| 5,915,784 A | * | 6/1999 | Clark | 297/215.15 |
| 5,979,978 A | * | 11/1999 | Olsen et al. | 297/215.15 |
| 6,019,422 A | * | 2/2000 | Taormino et al. | 297/195.1 |
| 2007/0164590 A1 | * | 7/2007 | Hsiao | 297/215.15 |

* cited by examiner

*Primary Examiner*—Peter R. Brown

(57) ABSTRACT

A bicycle seat tube adjusting assembly includes: a rod body which is installed with a positioning seat; a first clamping unit and a second clamping unit being assembled with the positioning seat; two channels being formed between the first clamping unit and the second clamping unit for clamping; an adjusting unit installed with the second clamping unit; the adjusting unit having at least one protrusion and at least one tightening unit abutting against the protrusion; and a positioning unit resting against the positioning seat; and wherein by the adjusting unit, the first clamping unit and second clamping unit are adjusted on the positioning seat so as to provide a preferred riding position.

5 Claims, 4 Drawing Sheets

BICYCLE SEAT TUBE ADJUSTING ASSEMBLY

FIELD OF THE INVENTION

The present invention relates to bicycles, and particularly to a bicycle seat tube adjusting assembly which is installed with an adjust seat and the seat makes the seat tube can adjust the seat so as to provide a preferred riding position.

BACKGROUND OF THE INVENTION

Bicycle has become a popular exercise, amusement and leisure tool. More and more people rides bicycles in daily life or in leisure time. It is not only improve the health of the driver, but also provide the pressure feeling to driver because in driving, the driver can see the beautiful scenery in driving path and breathes clean air.

Thus it is important that the cushion of the bicycle must make the driver feel comfortable with less fatigue driving so as to have a better affect in driving. As a result, the structure of the cushion and seat tube become important in design of the bicycle. The cushion must be soft and have preferred sock absorption ability. The seat tube must be designed to suit the pose, habit and size of the driver. In U.S. Pat. No. 5,466,042, the set tube is installed with a positioning seat which includes a first clamping unit and a second clamping unit. Two covers are transversally installed between the clamping units. One side of the seat tube is installed with a screw unit and another side thereof is installed with another screw unit. The screw unit has a teethed disk. Each screw unit passes through a cover and is assembled to the clamping unit and the positioning seat. In the unit, as the teethed disk is driven, one screw units will be tightened or released so as to adjust the orientation and position of the cushion.

However the structure has complicated structure and higher cost. The assembly is tedious and in adjustment, the screw units at two sides must be screwed at the same time as to adjustment the cushion. The operation is tedious and time consumed. Besides, in maintenance or repair, the whole structure must be detached for updating the parts, and then they are assembled again and the adjustment is done again for having a desiring orientation and position. Thus the prior art structure has longer manufacturing time, and greater producing cost, while the assembly and maintenance work are time consumed and tedious.

SUMMARY OF THE INVENTION

The present invention relates to a bicycle seat tube adjusting assembly which has a simple structure and need less cost and manufacturing time. Thereby the assembly and maintenance can be done easily and conveniently.

To achieve above object, the present invention provides a bicycle seat tube adjusting assembly having a rod body installed with a positioning seat. A positioning unit rests against the positioning seat. The positioning unit has two slots defined in a top thereof and extending therethrough. The positioning unit has two through holes formed in a side edge and extending laterally into the positioning unit such that each through hole joins one of the two slots. A second clamping unit is connected to the positioning unit. The second clamping unit has two channels formed in a top thereof and two protrusions extending from a bottom thereof. Each protrusion is movably received in one of the two slots in the positioning unit. A first clamping unit is connected to the second clamping unit. The first clamping unit has two channels formed in a bottom thereof. Each channel in the first clamping unit corresponds to one of the two channels in the second clamping unit for clamping a cushion rod. Two tightening units respectively pass through the two through holes in the positioning unit and are abutted against the two protrusions in the second clamping unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
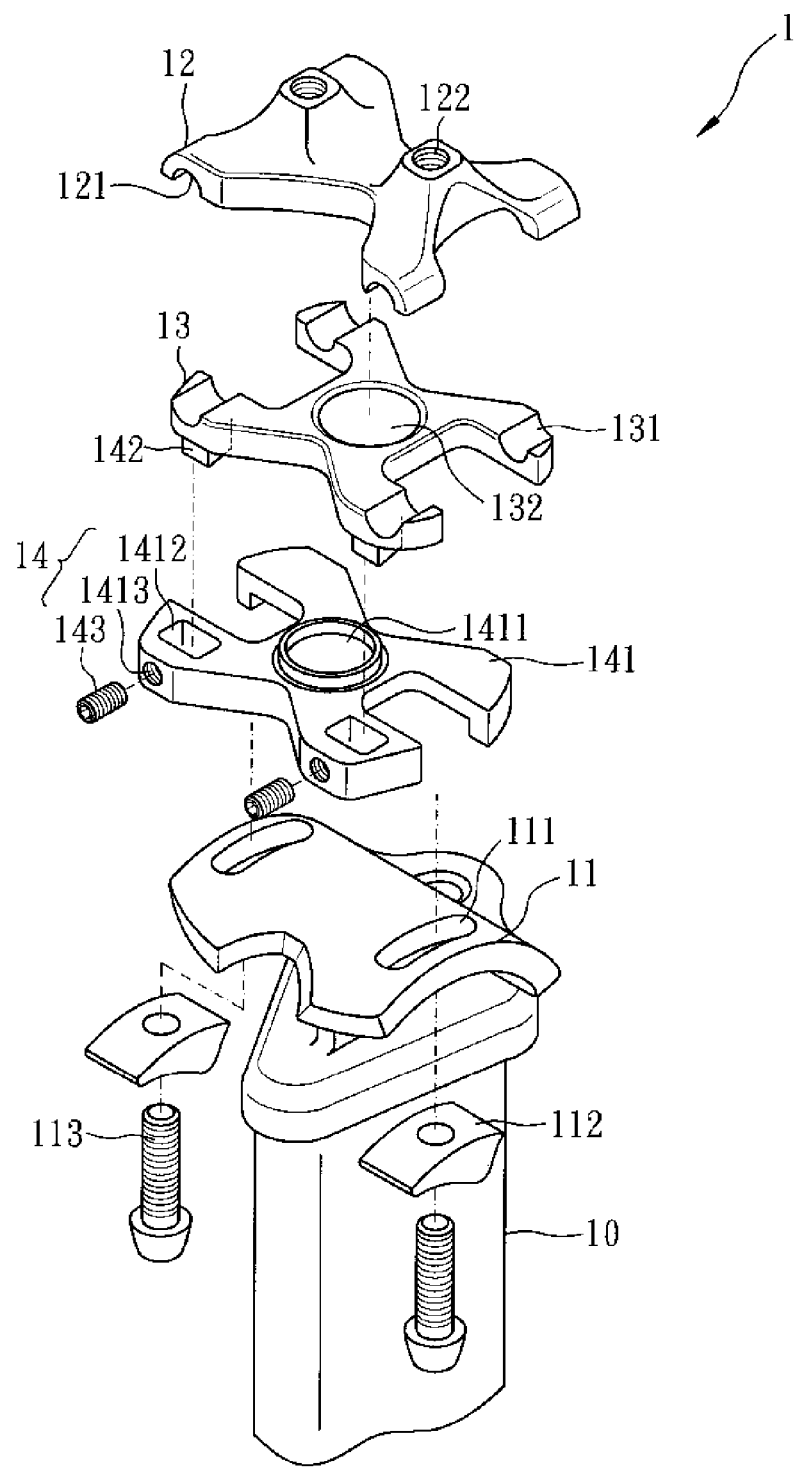
FIG. 1 is an exploded perspective view of a bicycle seat tube adjusting assembly of the present invention.
Figure 2:
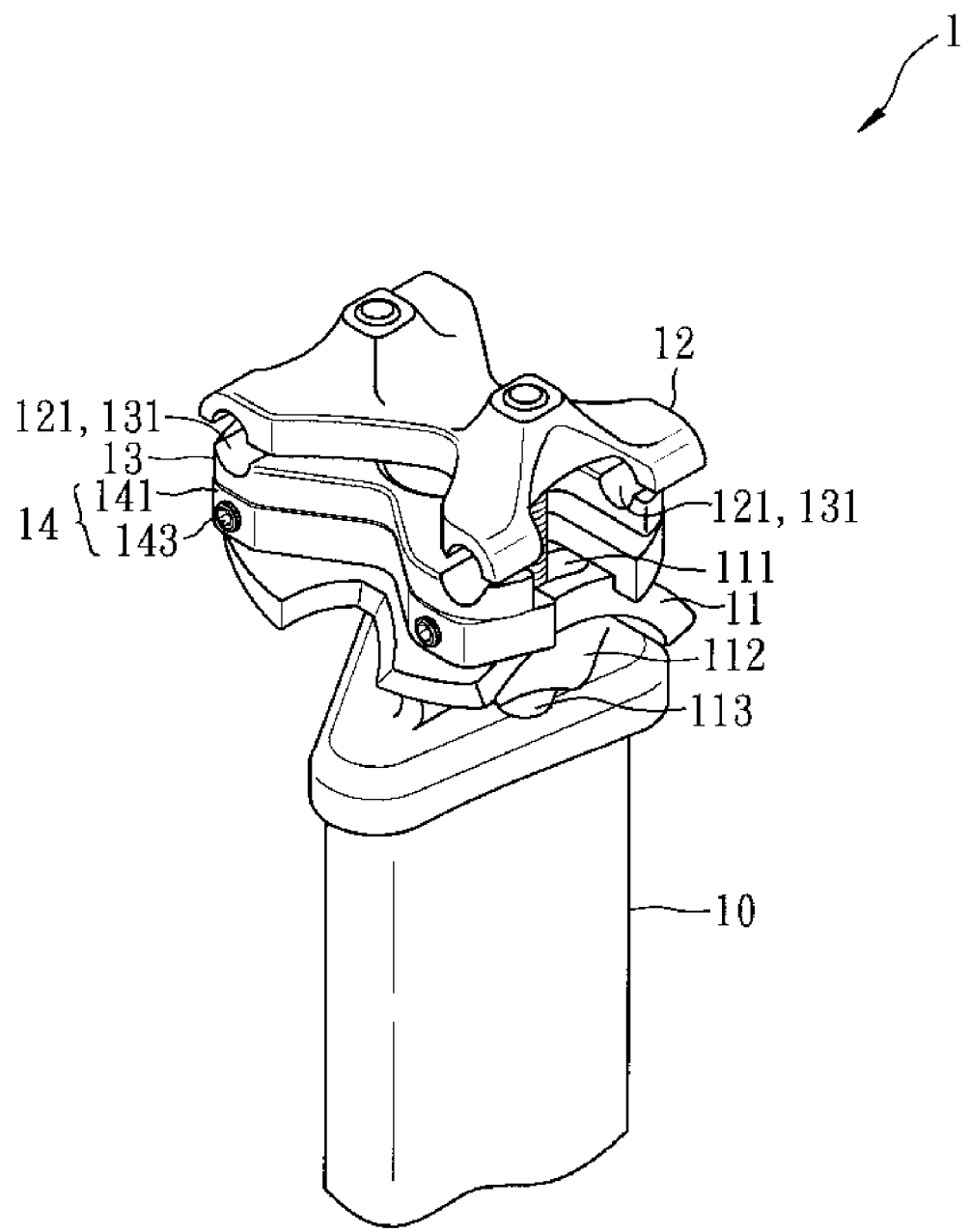
FIG. 2 is an assembled perspective view of the bicycle seat tube adjusting assembly of the present invention.

The present invention relates to a bicycle seat tube adjusting assembly, with reference to FIGS. 1 and 2, the assembly body 1 includes a rod body 10. A positioning seat 11 is installed in the rod body 10. A first clamping unit 12 and a second clamping unit 13 are mounted on a side of the positioning seat 11 for corresponding to the rod body 10. The first clamping unit 12 has two channels 121 and the second clamping unit 13 has two channels 131. After combination of the first clamping unit 12 and second clamping unit 13, the channels 121, 131 are used to clamp a seat (not shown) so as to retain the seat between the first clamping unit 12 and second clamping unit 13.

The first clamping unit 12 has two screw holes 122 defined therein. The second clamping unit 13 has one axial hole 132 defined therein.

An adjusting unit 14 is assembled with the second clamping unit 13. The adjusting unit 14 has a positioning unit 141 mounted on the positioning seat 11. Two protrusions 142 are extended from a bottom of the second clamping unit 13 and the adjusting unit 14 has two slots 1412 corresponding to the two protrusions 142 of the second clamping unit 13. A size of the slot 1412 is greater than that of the protrusion 142. The positioning unit 141 has a connecting shaft 1411 formed thereon for corresponding to the axial hole 132 of the second clamping unit 13. The positioning unit 141 has two through holes 1413 formed in a side edge and extending laterally into the positioning unit 141 such that each through hole 1413 joins one of the two slots 1412. Two tightening units 143 are respectively laterally mounted in the through holes 1413. In assembly, the connecting shaft 1411 is engaged with the axial hole 132 and the slots 1412 is assembled with the protrusions 142. The through hole 1413 is assembled with the tightening units 143 so that one end of the tightening unit 143 abuts against the sides of the protrusions 142.

The positioning seat 11 has two penetrating holes 111 defined therein. Two retaining seats 112 resist against a lower side of the positioning seat 11 opposite to the side of the positioning seat 11 which is installed with the adjusting unit 14. Each retaining seat 112 is screwed by a screw unit 113 which protrudes out from the retaining seat 112 and the penetrating hole 111 so as to lock into the screw hole 122 in the first clamping unit 12. By tightening the screw unit 113, the first clamping unit 12 and the positioning seat 11 are tightly engaged such that the assembly body 1 has a firm structure.

Figure 3:
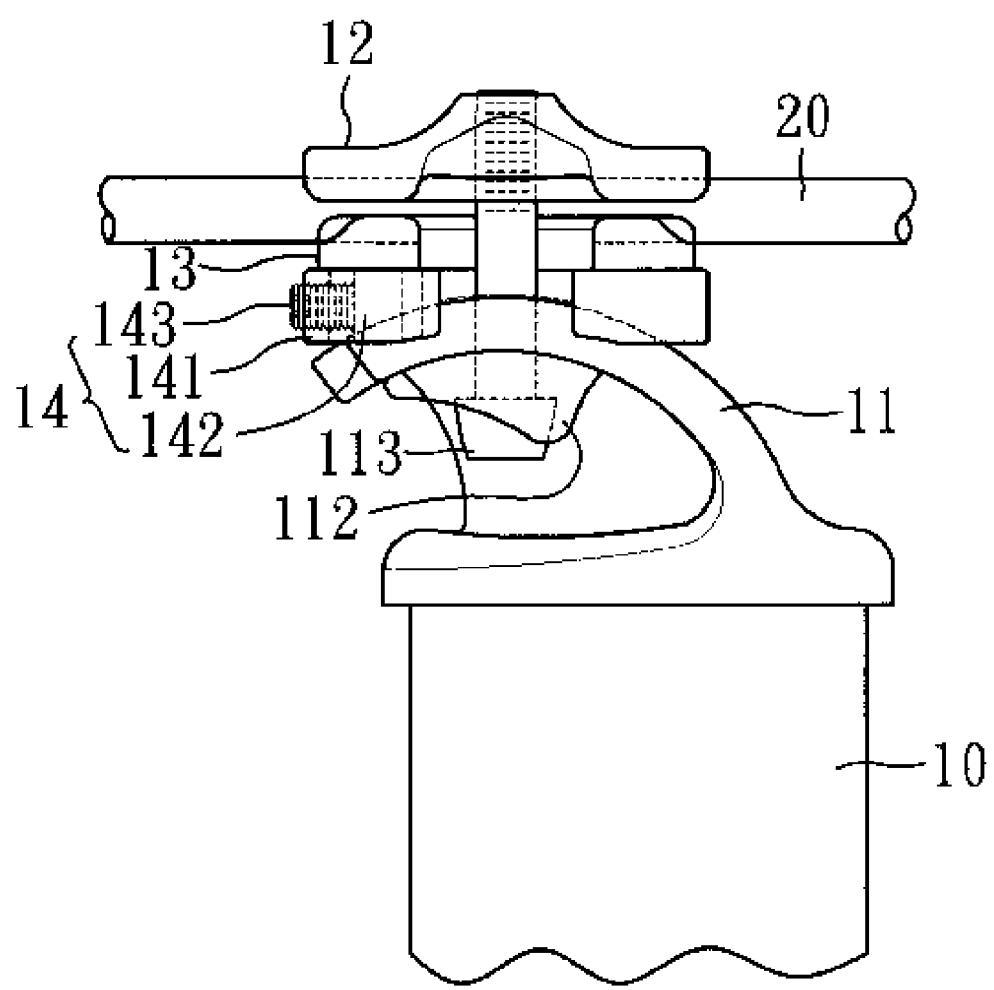
FIG. 3 is a side plane view of the bicycle seat tube adjusting assembly of the present invention.
Figure 4:
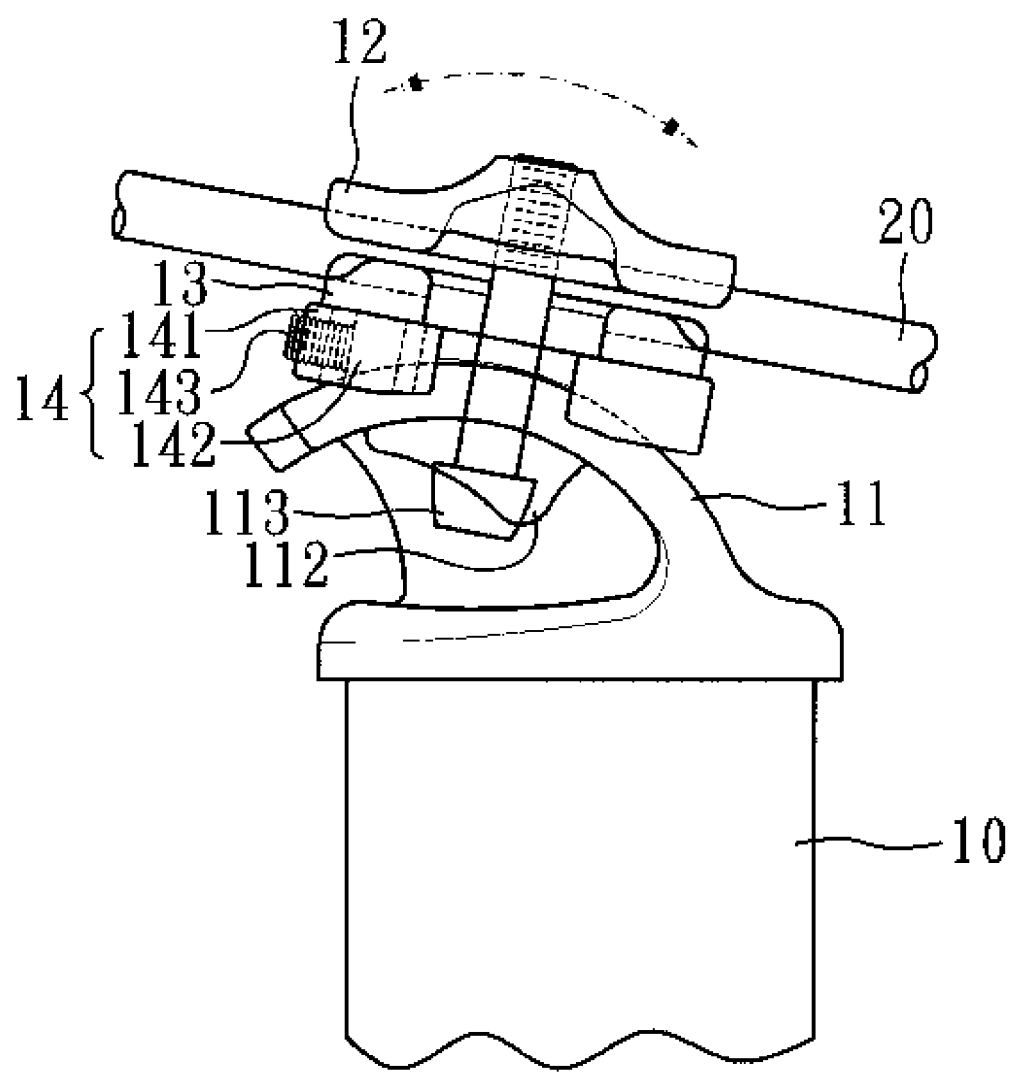
FIG. 4 is a side plane operational view of the bicycle seat tube adjusting assembly of the present invention showing the adjustment.

Referring to FIGS. 3 and 4, in the present invention, the seat has two cushion rod 20 respectively clamped by the first clamping unit 12 and the second clamping unit 13. The tightening unit 143 of the adjusting unit 14 is inward screwed to push the protrusions 142 to move along the direction of the force applied such that the second clamping unit 13, the cushion rod 20 and the first clamping unit 12 are move along the same direction. The connecting shaft 1411 is engaged to the axial hole 132 for retaining the positioning unit 141 and the second clamping unit 13 at the same horizontal plane in the adjusting process without shifting. The positioning effect of the positioning unit 141 relative to the second clamping unit 13 is improved such that the cushion rod 20 can be easily adjusted. The positioning unit 141 can be adjusted relative to the positioning seat 11 such that the cushion rod 20 can be adjusted finely.

The present invention has a simple structure and can be made easily. Only by the tightening engagement between the tightening unit 143 and the protrusion 142, an adjusting effect can be achieved so that the operation is easy and the maintenance and repair works can be done easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle seat tube adjusting assembly, comprising:
   a rod body which is installed with a positioning seat;
   a positioning unit resting against the positioning seat, the positioning unit having two slots defined in a top thereof and extending therethrough, the positioning unit having two through holes formed in a side edge and extending laterally into the positioning unit such that each through hole joins one of the two slots;
   a second clamping unit connected to the positioning unit, the second clamping unit having two channels formed in a top thereof and two protrusions extending from a bottom thereof, each protrusion movably received in one of the two slots in the positioning unit;
   a first clamping unit connected to the second clamping unit, the first clamping unit having two channels formed in a bottom thereof, each channel in the first clamping unit corresponding to one of the two channels in the second clamping unit for clamping a cushion rod; and
   two tightening units respectively passing through the two through holes in the positioning unit and abutted against the two protrusions in the second clamping unit;
   wherein the first clamping unit and the second clamping unit are driven to move when screwing the two tightening units.

2. The bicycle seat tube adjusting assembly as claimed in claim 1, wherein the positioning unit is formed with a connecting shaft; and the second clamping unit is formed with an axial hole; the connecting shaft is combinable into the axial hole so that during adjustment, the second clamping unit and the positioning unit are retained at the same horizontal plane without shifting.

3. The bicycle seat tube adjusting assembly as claimed in claim 1, further comprising: at least one screw unit for locking the first clamping unit and second clamping unit.

4. The bicycle seat tube adjusting assembly as claimed in claim 3 further comprising at least one retaining seat underlying the positioning unit corresponding to the at least one screw unit, wherein the at least one screw unit passes through the at least one retaining seat for enhancing the clamping effect.

5. The bicycle seat tube adjusting assembly as claimed in claim 1, wherein a size of each slot in the positioning unit is greater than that of the corresponding one of the two protrusions in the second clamping unit to allow adjustment therein.

* * * * *